United States Patent [19]

Kuno et al.

[11] 4,070,562
[45] Jan. 24, 1978

[54] ACCELERATION/DECELERATION ALARM SYSTEM

[75] Inventors: Akira Kuno, Nagoya; Yasuyuki Sakakibara, Okazaki, both of Japan

[73] Assignee: Nippon Soken, Inc., Nishio, Japan

[21] Appl. No.: 699,605

[22] Filed: June 24, 1976

[30] Foreign Application Priority Data

Aug. 28, 1975 Japan .............................. 50-104803
Aug. 29, 1975 Japan .............................. 50-105248

[51] Int. Cl.² ..................... B60T 8/12; G06F 15/20
[52] U.S. Cl. ........................... 364/426; 235/92 AE; 235/92 CC; 303/97; 340/62; 340/262; 364/566
[58] Field of Search .......... 235/92 AE, 150.2, 151.32; 303/95, 97, 106; 340/53, 62, 262; 361/239

[56] References Cited

U.S. PATENT DOCUMENTS

| | | | |
|---|---|---|---|
| 3,622,973 | 11/1971 | Domann et al. | 303/95 X |
| 3,744,854 | 7/1973 | Ooya et al. | 303/97 |
| 3,757,167 | 9/1973 | Yoshikawa et al. | 303/95 |
| 3,943,345 | 3/1976 | Ando et al. | 235/151.32 |

*Primary Examiner*—Felix D. Gruber
*Attorney, Agent, or Firm*—Cushman, Darby & Cushman

[57] ABSTRACT

A system for warning the driver of an acceleration or deceleration of a vehicle. A wheel sensor detects wheel rotational speeds $N_i$ and $N_{i+1}$ during two predetermined time intervals $T_i$ and $T_{i+1}$. The absolute value of the difference $|N_i - N_{i+1}|$ between the rotational speeds is computed by a computing circuit. Indicating means gives an indication of acceleration when the difference is greater than a predetermined value and when the speed difference is negative, whereas an indication of deceleration is given when the speed difference is positive.

4 Claims, 9 Drawing Figures

ACCELERATION/DECELERATION ALARM SYSTEM

BACKGROUND OF THE INVENTION

1. Field of the Invention

The present invention relates to an accelration/deceleration alarm system which gives a warning upon for example such rapid acceleration or deceleration of the running wheel of an automobile which would not occur under normal running conditions of the automobile.

2. Description of the Prior Art

Usually, when a running automobile is accelerated on a slippery road surface, there is the danger of the wheel slipping and rapidly increasing its rotational speed, whereas upon deceleration under braking the wheel tends to lock and suddenly stop rotating. The occurrence of such a condition is very dangerous since it causes the automobile to lose its steering capacity. The ordinary drivers solely rely on their intuition acquired through experience in avoiding such dangers and it is not an easy matter for inexperienced drivers to acquire such intuition.

SUMMARY OF THE INVENTION

With a view to overcoming the foregoing difficulty, it is the object of this invention to provide an acceleration/deceleration alarm system in which a detection signal corresponding to the rotational speed of a wheel is received as an input to compute the rotational speed of the wheel at intervals of a predetermined unit time, whereby assuming that $N_i$ represents the wheel rotational speed computed during an (i)th interval and $N_{i+1}$ represents the wheel rotational speed computed during the next $(i+1)$th interval, when the absolute value of the difference $(N_i - N_{i+1})$ between the two rotational speeds is greater than a predetermined value and the difference is negative, an indication of acceleration is given, whereas when the difference is positive an indication of deceleration is given, thus indicating that the acceleration or deceleration was greater than the preset value and thereby making it possible to discriminate acceleration/deceleration rates with a high degree of accuracy.

DESCRIPTION OF THE PREFERRED EMBODIMENTS

Figure 1:
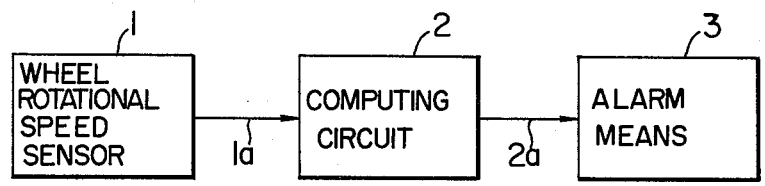
FIG. 1 is a simplified block diagram showing a first embodiment of an acceleration/deceleration alarm system according to this invention.

The present invention will now be described with reference to the illustrated first embodiment. Referring to FIG. 1 illustrating a block diagram showing the simplified general construction of the acceleration/deceleration alarm system according to the invention, numeral 1 designates a wheel rotational speed sensor for generating a detection signal having a frequency corresponding to the rotational speed of the wheel of a running vehicle. Numeral 2 designates a computing circuit responsive to the detection signal from the wheel rotational speed sensor 1, whereby assuming that $N_i$ represents the rotational speed of the wheel during a predetermined unit time $T_i$ and $N_{i+1}$ represents the rotational speed of the wheel during the next predetermined time $T_{i+1}$, the absolute value $|N_i - N_{i+1}|$ of the difference between the two speeds is computed and a discrimination signal is generated when the computed absolute value is greater than a preset value $N_0$. Numeral 3 designates alarm means responsive to the discrimination signal for giving an alarm and warning the driver.

Figure 2:
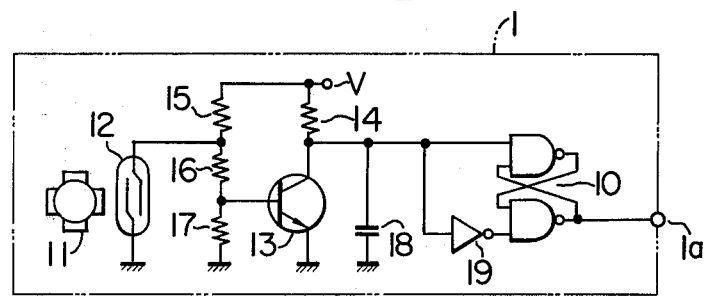
FIG. 2 is a wiring diagram showing the detailed construction of the wheel rotational speed sensor shown in FIG. 1.

The detailed construction and operation of the individual circuits of the first embodiment will now be described. The wheel rotational speed sensor 1 shown in FIG. 2 comprises a reed switch 12 positioned near a magnet 11 adapted to be rotated by the speedometer cable of the vehicle so that the reed switch 12 is repeatedly opened and closed in response to the rotation of the magnet 11 generating pulses having a frequency proportional to the rotational speed of the wheel of the vehicle. To subject these pulses to waveform shaping, there are further provided a transistor 13, resistors 14, 15, 16 and 17, a capacitor 18, an inverter 19 and an R-S flip-flop 10. In this first embodiment, 2,548 pulses are generated at an output terminal 1a for every 1 km traveled by the vehicle.

Figure 3:
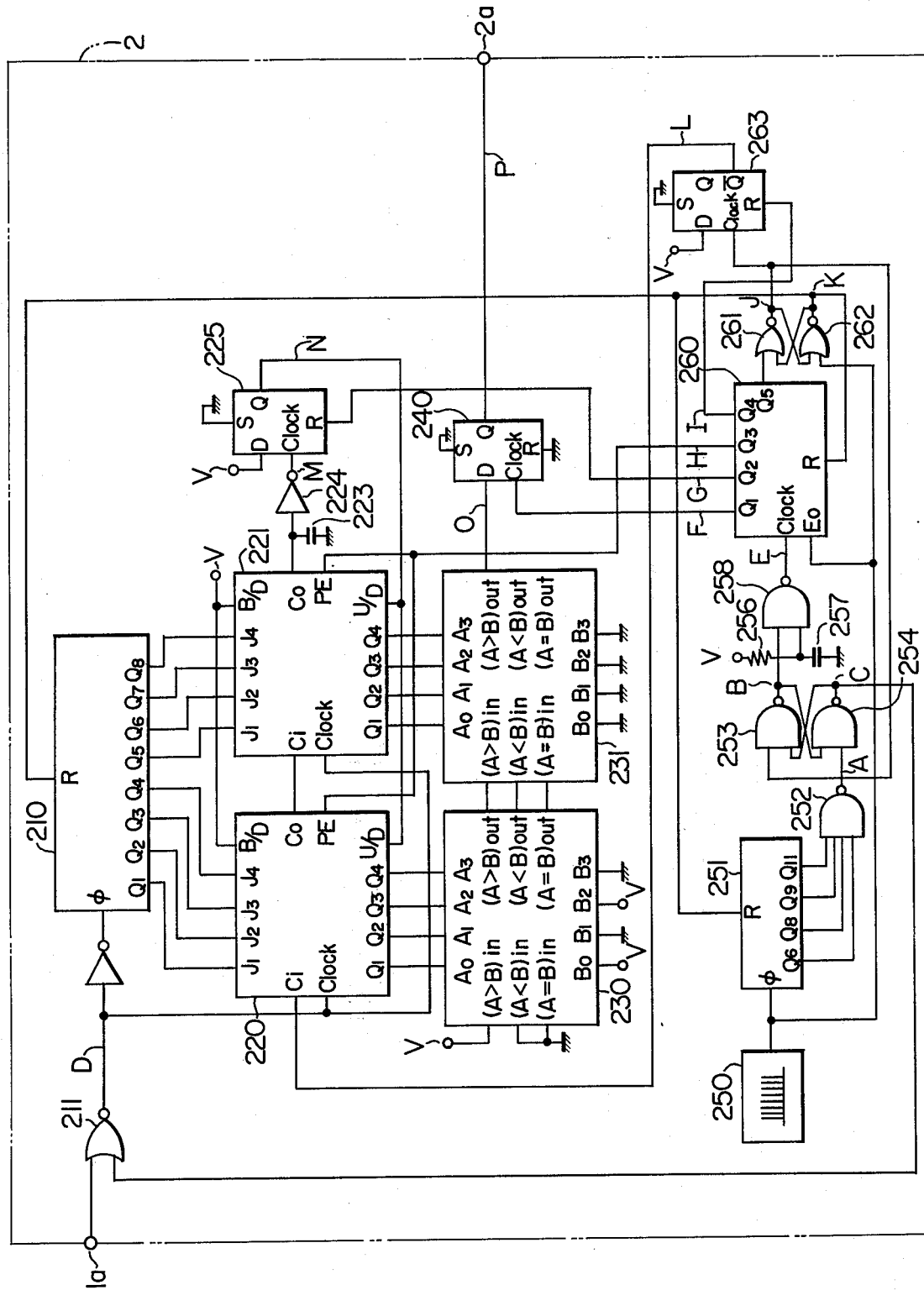
FIG. 3 is a wiring diagram showing the detailed construction of the computing circuit shown in FIG. 1.
Figure 4:
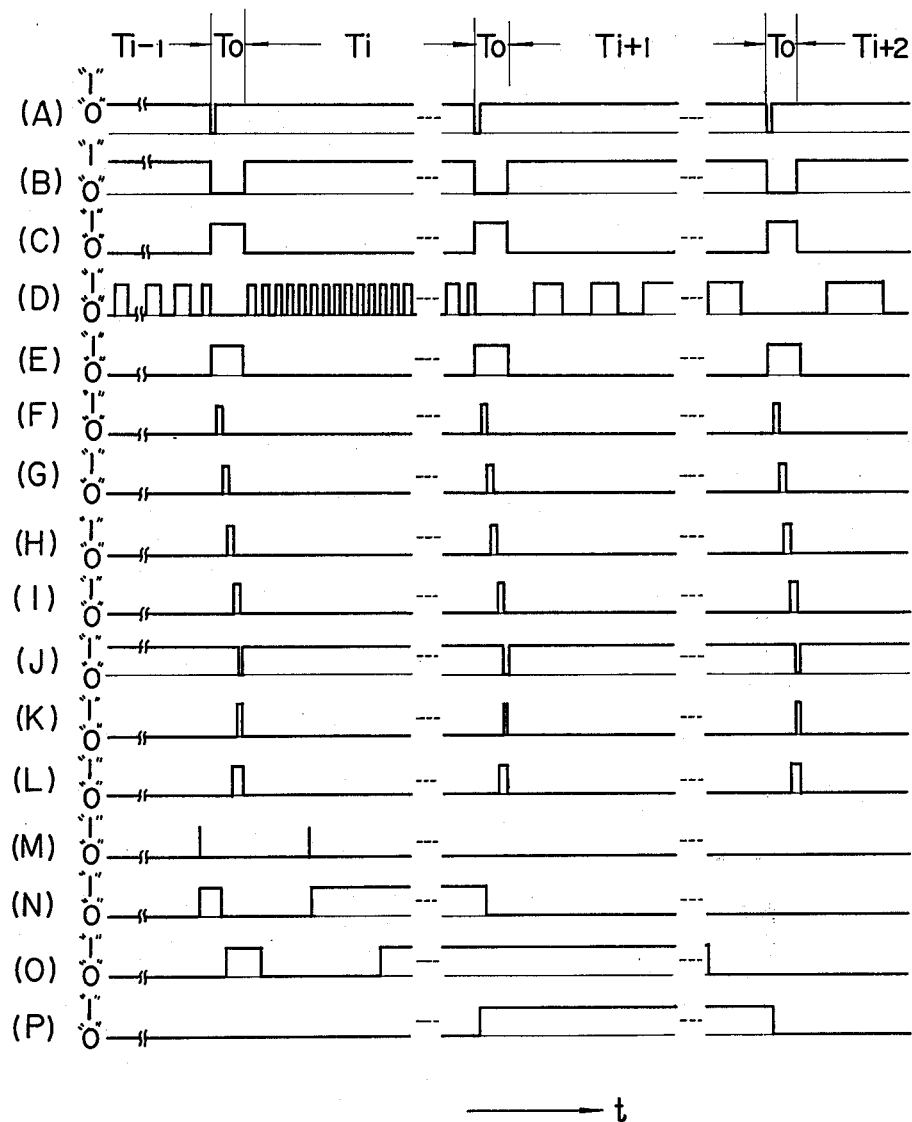
FIG. 4 is a signal waveform diagram useful in explaining the operation of the computing circuit shown in FIG. 3.

FIG. 3 is a wiring diagram showing the detailed construction of the computing circuit 2, and the signal waveforms generated at points A to P in the circuitry of FIG. 3 are shown in (A) to (P) of FIG. 4. The detection signal from the wheel rotational speed sensor 1 is delivered to the terminal 1a. Numeral 250 designates a clock pulse generating circuit which is designed to generate clock pulses of 2,048 Hz in this embodiment and the clock pulses are then subjected to frequency division by a frequency divider circuit 251 comprising the RCA IC CD4040. Consequently, as shown in (A) of FIG. 4, a "0" pulse is generated at an output point A of a NAND gate 252 for every 1440 clock pulses applied to an input Φ of the frequency divider circuit 251. This period is 1,440/2,048 (sec) + $T_o$(sec) as will be seen from (A) of FIG. 4. When a "0" pulse is generated as shown in (A) of FIG. 4, output points B and C of an R-S flip-flop comprising NAND gates 253 and 254 respectively go to a "0" level and a "1" level as shown in (B) and (C) of FIG. 4. Consequently, the detection signal at the terminal 1a is not passed to an output point D of a NOR gate 211 as shown in (D) of FIG. 4. Also an output point E of a NAND gate 258 goes to the "1" level as shown in (E) of FIG. 4. This is due to the fact that an automatic cancellation circuit comprising a resistor 256 and a capacitor 257 and connected to the other input terminal of the NAND gate 258 is held at the "1" level except at the time of connecting the power source. When the output point E goes to the "1" level, as shown in (F), (G), (H) and (I) of FIG. 4, a decooder circuit 260 comprising the RCA IC CD4017 sequentially generates a "1" level pulse at each of points F, G, H and I in response to the 2,048 Hz clock pulses arriving at the point $E_o$. As a result, firstly when 6 pulses are applied to the point D during an interval $T_{i-1}$ of FIG. 4 (1,440/2,048 ≃ 0.70 sec), the stored contents of a counter circuit 210 comprising the RCA IC CD4040 represents 6 and the contents are read into up-down counters 220 and 221 each comprising the RCA IC CD4029 when a "1" level pulse is generated at the point H as shown in (H) of FIG. 4. Thereafter, when the point I goes to the "1" level as shown in (I) of FIG. 4, an output point L of a D-type flip-flop 263 comprising the RCA IC CD4013 goes to the "1" level as shown in (L) of FIG. 4 and then the point L goes back to the "0" level as shown in (L) of FIG. 4 when a $Q_5$ output of the decoder circuit 260 goes to the "1" level so that a "0" level pulse and a "1" level pulse are respectively generated at output points J and K of an R-S flip-flop comprising NOR gates 261 and 262 as shown in (J) and (K) of FIG. 4. Simultaneously, the points B and C respectively go back to the "1" level and the "0" level as shown in (B) and (C) of FIG. 4. Consequently, the output point E of the NAND gate 258 goes to the "0" level as shown in (E) of FIG. 4 so that the counting of the clock pulses is terminated and the decoder circuit 260 is simultaneously reset. Also the counter circuit 210 and the frequency divider circuit 251 are reset. Prior to this occurrence, a D-type flip-flop 225 is reset in response to the application of the "1" level pulse to the point G as shown in (G) of FIG. 4 and its Q output point N goes to the "0" level as shown in (N) of FIG. 4. When the point N goes to the "0" level, the up-down counters 220 and 221 are set to count down. On the other hand, at the instant that the point C goes to the "0" level the detection signal from the terminal $1a$ appears at the output point D of the NOR gate 211 and it is counted by the counter circuit 210. Simultaneously, since the count 6 has previously been stored in the up-down counters 220 and 221, the count 6 is caused to descend from 6 to 5, 4, 3, — and 0 in response to each of the pulses applied to the point D so that when the count is reduced to "0", an output terminal $C_o$ of the up-down counter 221 (which is connected to a noise reducing capacitor 223) goes to the "0" level and thus a "1" level pulse is applied through an inverter 224 to the clock terminal (point M) of the D-type fli-flop 225 as shown in (M) of FIG. 4. Consequently, the Q output point N of the D-type flip-flop 225 goes to the "1" level as shown in (N) of FIG. 4 and the up-down counters 220 and 221 are set to count up. As a result, when the next pulses appear at the point D, the count advances successively from 0 to 1, 2, —. When the signal generated at the point A by the frequency divider circuit 251 and the NAND gate 252 goes to the "0" level as shown in (A) of FIG. 4, the computation for the (i)th interval $T_i$ is completed. Assuming that the detection signal consisting of 13 pulses appeared at the point D during the (i)th interval $T_i$, the remaining count in the up-down counters 220 and 221 is $|6 - 13| = 7$. The contents are coupled to inputs A of comparison circuits 230 and 231 each comprising the RCA IC CD4063 and the contents are compared with a preset value (5 in this embodiment) which was preliminarily applied to the other inputs B thereof. Consequently, when $A \geq B$, an output point O goes to the "1" level, whereas when $A < B$ the output point O goes to the "0" level. Since the deviation or difference 7 between the intervals $T_{i-1}$ and $T_i$ is greater than the preset value 5, the point 0 goes to the "1" level as shown in (0) of FIG. 4. And similarly as mentioned previously, a "1" level pulse is generated sequentially at each of the points F, G, H and I so that when a "1" level pulse appears at the point F as shown in (F) of FIG. 4, a "1" level discrimination signal is generated at an output point P of a D-type flip-flop 240 as shown in (P) of FIG. 4. On the other hand, the counter circuit 210 has counted up to 13 and the count is read into the up-down counters 220 and 221 when a "1" level pulse appears at the point H as shown in (H) of FIG. 4. Thereafter, when a "1" level pulse appears at the point K, the counter circuit 210 is reset and its contents are cleared to 0.

Then, after the computation for the next (i + 1) the interval $T_{i+1}$ has been initiated, if a detection signal consisting of 9 pulses appears at the point D during the interval $T_{i+1}$, since the number of pulses appeared during the interval $T_i$ was 13, the remaining count is $|13 - 9| = 4$ which is smaller than the preset value 5 and consequently the output point 0 of the comparison circuit 231 goes to the "0" level as shown in (O) of FIG. 4. Thus, when a "1" level pulse appears at the point F, the output point P goes to the "0" level as shown in (P) of FIG. 4. In this way, assuming that the detection signal appearing during the (i)th interval $T_i$ comprised $N_i$ pulses and the detection signal appearing during the next (i + 1)th interval $T_{i+1}$ comprised $N_{i+1}$ pulses, a "1" level discrimination signal is generated at the point P or an output terminal $2a$ when the value of $|N_i - N_{i+1}|$ is greater than the preset value $N_o$, whereas a "0" level discrimination signal is generated at the point P or the output terminal $2a$ when the value of $|N_i - N_{i+1}|$ is smaller than the preset value $N_o$. In this first embodiment, since the unit time of each interval is selected 0.70 second and the period of detection signal is selected $(637 \times 4)/60$ r.p.m. at the running speed of 60 km/h, if the preset value $N_o$ is selected 5, for example, then we obtain 0.081G × 5 (where G is the acceleration by gravity = 9.8 m/s²). Thus, in the first embodiment, when there is a change in the speed of the wheel which is greater than 0.405 G, a "1" level discrimination signal is generated at the output terminal $2a$, whereas a "0" level discrimination signal is generated at the output terminal $2a$ when the speed change is smaller than 0.405 G.

Figure 5:
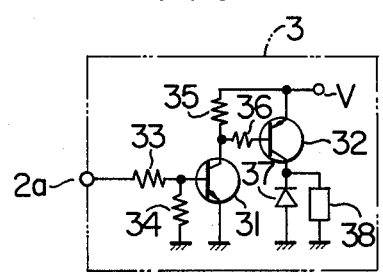
FIG. 5 is a wiring diagram showing the detailed construction of the alarm means shown in FIG. 1.

Referring now to FIG. 5, there is illustrated a wiring diagram showing the detailed construction of the alarm means 3 which is so designed that a buzzer 38 is actuated by a drive circuit comprising transistors 31 and 32 and resistors 33, 34, 35 and 36 in response to the "1" level discrimination signal received from the terminal $2a$ of the computing circuit 2, and a diode 37 is provided for noise reducing purposes. In this circuit, when the output terminal $2a$ goes to the "1" level the buzzer 38 sounds a warning, whereas the buzzer 38 is inoperative when the output terminal $2a$ is at the "0" level. Consequently, when the variation of the wheel rotational speed is greater than the preset value, the buzzer 38 sounds a warning, whereas the buzzer 38 stops sounding the warning when the variation of the wheel rotational speed is less than the preset value.

The wheel rotational speed sensor 1 used in the above-described first embodiment may for example be of a photo electric type, electromagnetic type or generator type provided that it is capable of generating a signal corresponding to the rotational speed of the wheel.

Further, the computing circuit 2 may be replaced with any other type of known desk calculator provided that it is capable of computing the absolute value $|N_i - N_{i+1}|$ of the difference and comparing it with the preset value $N_o$ to generate a signal representing the comparison result.

Still further, while the alarm means 3 uses the buzzer 38 for giving a warning, the similar results may be obtained by any other means such as a light emitting diode, television screen or the like.

Figure 6:
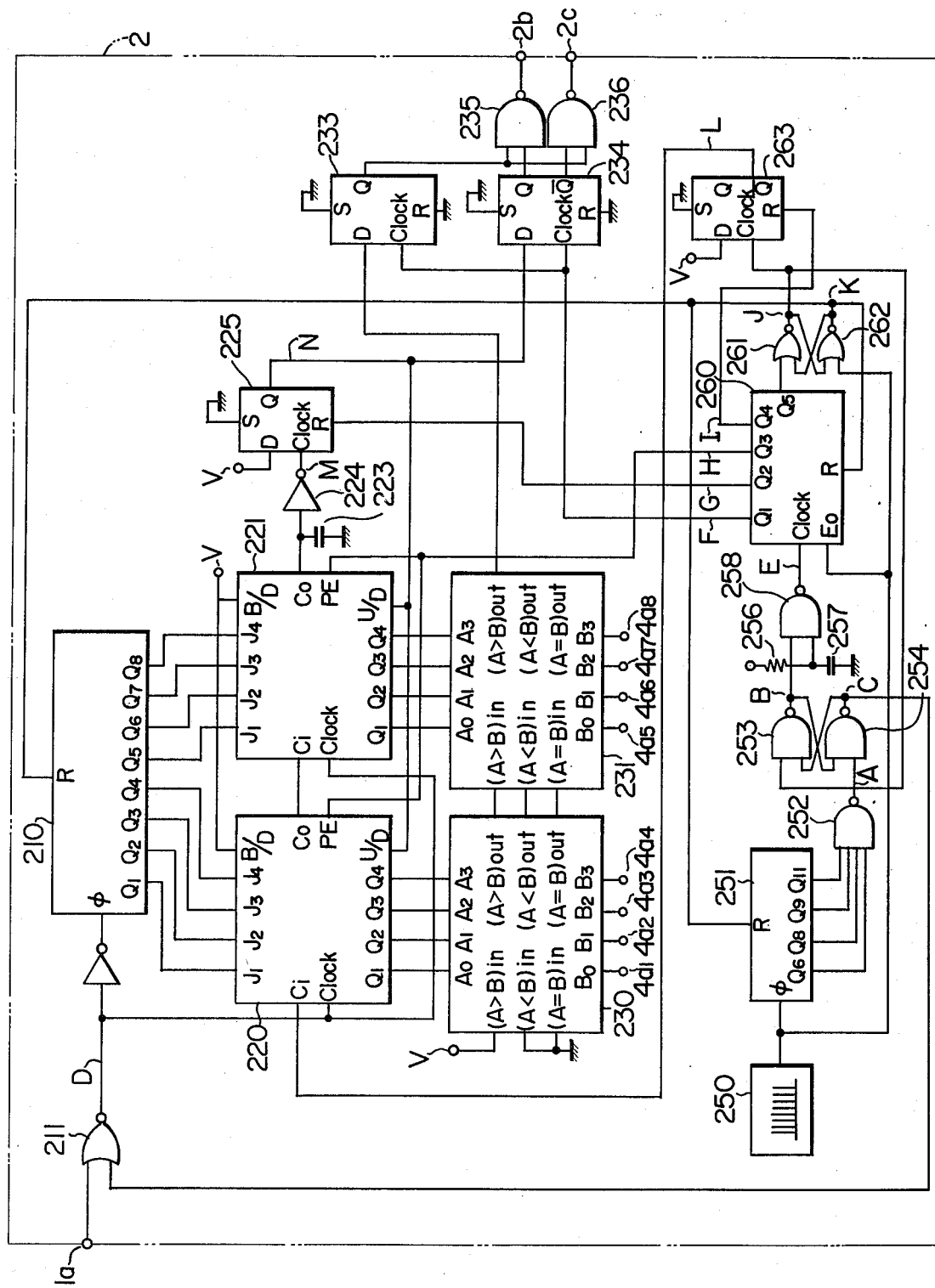
FIG. 6 is a wiring diagram showing the detailed construction of the computing circuit used in a second embodiment of the invention.
Figure 7:
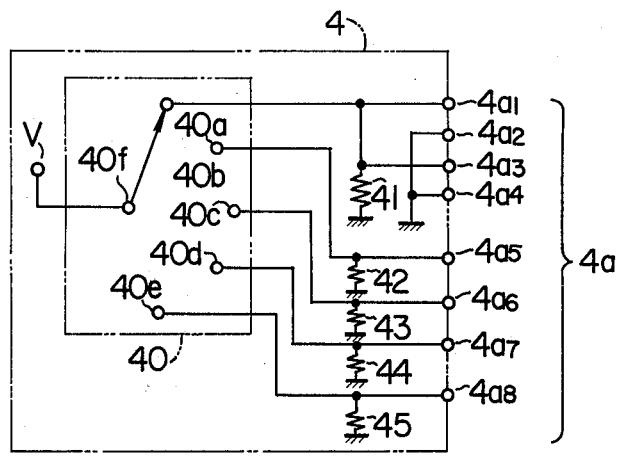
FIG. 7 is a wiring diagram of the preset switch circuit used in the second embodiment.

A second embodiment of the invention will now be described with reference to FIGS. 6 to 8. FIG. 6 shows a computing circuit 2 which differs from that of the first embodiment shown in FIG. 3 in that the preset value $N_o$ which is applied to the inputs B of comparison circuits 230 and 231 may be preset as desired and D-type flip-flops 233 and 234 and NAND gates 235 and 236 are connected in the manner as shown in the Figure. FIG. 7 shows a preset switch circuit 4 for presetting the preset value $N_o$ which uses a rotary switch 40. The rotary switch 40 has its common terminal 40f connected to a power source V and its other terminals 40a, 40b, 40c, 40d and 40e are arranged so that when the common terminal 40f is connected selectively to the terminals 40a, 40b, 40c, 40d and 40e, respectively, terminals $4a_1$ and $4a_3$ go to the "1" level, a terminal $4a_5$ goes to the "1" level, a terminal $4a_6$ goes to the "1" level, a terminal $4a_7$ goes to the "1" level and a terminal $4a_8$ goes to the "1" level, respectively, with the remaining terminals going to the "0" level. Consequently, since the terminals 4a of the preset switch circuit 4 apply an input signal to the inputs B of the comparison circuits 230 and 231 of FIG. 6, when the common terminal 40f of the rotary switch 40 is selectively connected to the terminals 40a to 40e, the resulting binary coded signals selectively generated at the terminals 4a represent 5, 10, 20, 40 and 80, respectively. In FIG. 7, resistors 41, 42, 43, 44 and 45 are bias resistors so that when the common terminal 40f of the rotary switch 40 is connected to any one of the terminals 40a to 40e, the remaining terminals are caused to go to the "0" level.

Assuming now that the preset value $N_o$ is set to 5 by the preset switch circuit 4, it is generated at the terminals 4a ($4a_1$ to $4a_8$) so that N represents the result obtained when the point F in the computing circuit 2 goes to the "1" level. If, at this time, the point N is at the "0" level, the output Q of the D-type flip-flop 233 of FIG. 6 goes to the "1" level when N≧5, whereas the output Q goes to the "0" level when N<5. Also the outputs Q and $\overline{Q}$ of the D-type flip-flop 234 respectively go to the "0" and "1" level. As a result, output terminals 2b and 2c of the NAND gates 235 and 236 respectively go to the "1" and "0" level when N≧5, whereas both of the output terminals 2b and 2c go to the "1" level when N<5. While the foregoing was the case where the point N was at the "0" level when the point F went to the "1" level, where the point N is at the "1" level when the point F goes to the "1" level, similarly the output terminal 2b goes to the "0" level and the output terminal 2c goes to the "1" level when N≧5, whereas both of the output terminals 2b and 2c go to the "1" level when N<5.

Figure 8:
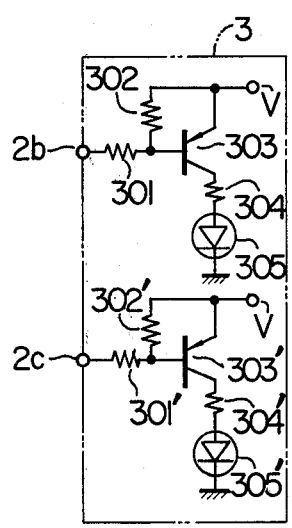
FIG. 8 is a wiring diagram of the indicating circuit used in the second embodiment.

An alarm circuit 3 shown in FIG. 8 comprises resistors 301, 302, 304, 301', 302' and 304', transistors 303 and 303', an acceleration lamp 305 and a deceleration lamp 305' and each of the acceleration and deceleration lamps 305 and 305' consists of a light emitting diode indicating lamp. In this alarm circuit 3, the acceleration lamp 305 is lighted only when the terminal 2b goes to the "0" level, while the deceleration lamp 305' is lighted only when the terminal 2c goes to the "0" level.

The operation of the second embodiment may be summarized as follows. Assuming that $N_i$ represents the rotational speed of the wheel during an (i)th interval, $N_{i+1}$ represents the rotational speed of the wheel during the next (i + 1)th interval and $N_o$ represents the value preset by the preset switch circuit 4, if $|N_i - N_{i+1}| \geq N_o$, then the acceleration lamp 305 is lighted when the result of $N_i - N_{i+1}$ is negative, whereas the deceleration lamp 305' is lighted when the result of $N_i - N_{i+1}$ is positive. When $|N_i - N_{i+1}| < N_o$, both of the acceleration lamp 305 and the deceleration lamp 305' are not lighted regardless of whether the result of $N_i - N_{i+1}$ is positive or negative.

Thus, when the acceleration or deceleration rate of the wheel rotational speed is greater than the value preset by the preset switch circuit 4, either the acceleration lamp 305 or the deceleration lamp 305' is lighted. By virtue of the provision of the preset switch circuit 4, the preset value may be changed as desired.

Figure 9:
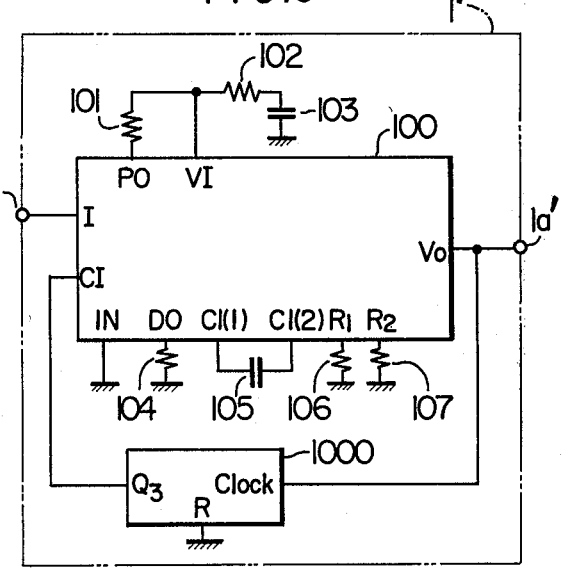
FIG. 9 is a wiring diagram showing the frequency multiplier circuit used in the second embodiment.

In this embodiment, the detection signal from the wheel rotational speed sensor 1 is directly measured and therefore it is impossible to detect acceleration and deceleration rates by delicate driving. The duration of each interval for computation and indication may be shortened by multiplying the wheel rotational speed detection signal generated from the wheel rotational speed sensor 1 by a frequency multiplier circuit 1' shown in FIG. 9 and applying the resulting signal as a multiplied wheel rotational speed signal to the computing circuit 2. For example, assuming that the duration of each interval is 2 seconds in the above-described embodiment, if the multiplication by K is accomplished by the frequency multiplier circuit 1', the computation and indication may be performed for every interval of 2 sec $\div \sqrt{K} = 2/\sqrt{K}$) sec. FIG. 9 shows the frequency multiplier circuit 1' comprising a circuit 100 consisting of the known RCA IC CD4046, a counter 1000 consisting of the RCA IC CD4024, resistors 101, 102, 104, 106 and 107 and capacitors 103 and 105. This circuit has a multiplication factor of 8. This circuit multiplies the pulses applied to the input terminal 1a and produces at its output terminal 1a' output pulses whose frequency is 8 times that of the input pulses.

We claim:
1. An acceleration/deceleration alarm system comprising:
    speed measuring means for generating a train of pulses having a frequency proportional to the running speed of a vehicle;
    first counting means for counting the number of said pulses applied from said speed measuring means during an (i)th constant time interval;
    second counting means for counting down the count value of said first counting means in response to said pulses applied from said speed measuring means after the lapse of said (i)th constant time interval until the time when said count value is counted down to zero;
    third counting means for counting the number of said pulses applied from said speed measuring means after the completion of the counting operation of said second counting means;
    control means for controlling the successive operating time interval of said second and third counting means to an (i+1)th constant time interval which follows from said (i)th constant time interval so that the count value of said second counting means is proportional to the decelerating speed difference between said ($i$)th and ($i+1$)th constant time intervals when said ($i+1$)th constant time interval terminates during the counting operation of said second counting means and so that the count value of said third counting means is proportional to the accelerating speed difference between said ($i$)th and ($i+1$)th constant time intervals when said ($i+1$)th constant time interval terminates during the counting operation of said third counting means;

setting means for presetting a reference value;

comparing means for comparing the count value of said second and third counting means with said reference value preset by said setting means; and alarm means for giving a warning when said count value applied to said comparing means exceeds said reference value.

2. An alarm system according to claim 1 further comprising:

detecting means for detecting the deceleration of the vehicle when said second counting means is still counting down the count value of said first counting means at the lapse of said (i+1)th constant time period and the acceleration thereof when said third counting means is counting the number of said pulses at the lapse of the same, whereby said alarm means is enabled to indicate the deceleration and acceleration thereof in response to the detection result of said detecting means.

3. An alarm system according to claim 1 further comprising:

frequency multiplying means for multiplying the frequency of said pulses by a predetermined constant value and applying the resulting pulses to said first, second and third counting means.

4. An acceleration/deceleration alarm system comprising:

a second sensor for generating a train of pulses having a frequency proportional to the rotational speed of wheel of a vehicle;

a first counter, connected to said speed sensor, for counting the number of said pulses after the resetting thereof;

an up-down counter, connected to said speed sensor and said first counter, for counting down the count value of said counter to zero in response to said pulses and thereafter counting up the number of said pulses;

an oscillator for generating clock pulses of a fixed frequency;

control circuit means for said counters, connected to said oscillator, for generating a reset signal each time when the number of said clock pulses reaches a predetermined constant value to thereby reset said first counter, and a preset signal in a timed relationship with said reset signal to thereby render said up-down counter to start a count-down operation which is followed by a count-up operation;

a comparator, connected to said up-down counter, for comparing the output value of said up-down counter with a predetermined reference value; and warning circuit means, connected to said comparator, for giving a warning when the output value of said up-down counter exceeds said reference value.

* * * * *